(12) United States Patent
Just et al.

(10) Patent No.: US 8,397,329 B2
(45) Date of Patent: Mar. 19, 2013

(54) ARTICULATED LOADING RAMP

(75) Inventors: Jan Just, Bloomfield Hills, MI (US); Michael T. Williard, Harrison Township, MI (US)

(73) Assignee: Magna Car Top Systems GmbH, Rochester Hills, MI (US)

( * ) Notice: Subject to any disclaimer, the term of this patent is extended or adjusted under 35 U.S.C. 154(b) by 70 days.

(21) Appl. No.: 12/936,612

(22) PCT Filed: Apr. 7, 2009

(86) PCT No.: PCT/US2009/039774
§ 371 (c)(1),
(2), (4) Date: Oct. 6, 2010

(87) PCT Pub. No.: WO2009/126627
PCT Pub. Date: Oct. 15, 2009

(65) Prior Publication Data
US 2011/0023245 A1 Feb. 3, 2011

Related U.S. Application Data

(60) Provisional application No. 61/123,393, filed on Apr. 7, 2008.

(51) Int. Cl.
*E04F 11/00* (2006.01)
*B60N 5/00* (2006.01)

(52) U.S. Cl. ............ 14/71.1; 14/69.5; 14/73.1; 141/537

(58) Field of Classification Search .......... 14/69.5–71.3, 14/71.7, 72.5, 73.1; 414/537
See application file for complete search history.

(56) References Cited

U.S. PATENT DOCUMENTS

| | | | | |
|---|---|---|---|---|
| 3,711,882 A * | 1/1973 | Iller | ................................. | 14/69.5 |
| 4,084,713 A * | 4/1978 | Rohrs et al. | ................... | 414/537 |
| 4,155,468 A * | 5/1979 | Royce | ........................... | 414/556 |
| 4,488,833 A * | 12/1984 | Perry et al. | ....................... | 404/35 |
| 4,703,597 A * | 11/1987 | Eggemar | ..................... | 52/220.2 |
| 5,156,432 A * | 10/1992 | McCleary | ........................ | 296/61 |
| 5,347,672 A * | 9/1994 | Everard et al. | ................ | 14/69.5 |
| 5,380,144 A * | 1/1995 | Smith et al. | ................... | 414/537 |
| 5,775,232 A * | 7/1998 | Golemis et al. | .............. | 105/458 |
| 5,832,555 A * | 11/1998 | Saucier et al. | ................ | 14/71.1 |
| D412,224 S * | 7/1999 | Adler | ........................... | D30/119 |
| 6,102,648 A * | 8/2000 | Fretwell et al. | .............. | 414/540 |
| 6,238,168 B1 * | 5/2001 | Cohn et al. | .................. | 414/537 |
| 6,389,629 B1 * | 5/2002 | Schouest | ....................... | 14/69.5 |
| 6,430,769 B1 * | 8/2002 | Allen | ............................ | 14/69.5 |
| 6,722,721 B2 * | 4/2004 | Sherrer et al. | .................. | 296/61 |
| 6,880,194 B2 * | 4/2005 | O'Donnell et al. | ............ | 14/69.5 |
| 6,928,959 B1 * | 8/2005 | Trauernicht et al. | .......... | 119/847 |
| 7,160,055 B2 * | 1/2007 | Beamish et al. | ............... | 404/36 |
| 7,228,582 B1 * | 6/2007 | Jones et al. | ..................... | 14/71.1 |
| 7,802,337 B2 * | 9/2010 | van Roosmalen et al. | ..... | 14/69.5 |
| 2002/0110444 A1 * | 8/2002 | Navarro | ........................ | 414/537 |
| 2003/0182740 A1 * | 10/2003 | Schmaltz et al. | .............. | 14/69.5 |
| 2003/0233809 A1 * | 12/2003 | Pervan | ......................... | 52/783.1 |

(Continued)

*Primary Examiner* — Raymond W Addie
(74) *Attorney, Agent, or Firm* — Brooks Kushman P.C.

(57) ABSTRACT

A loading ramp for a vehicle that includes at least three articulated sections. The ramp is assembled to and stored on a floor of the vehicle. The ramp is extended from the vehicle with at least one section being retained on the floor. The sections outboard of the vehicle are retained in alignment at a ramp angle with the first section being pivoted relative to the last floor retained section to the ramp angle. A power extension and retraction device may be provided that drives the loading ramp reciprocally relative to the vehicle. Side edge guards are provided on the sides of the loading ramp and may be folded over when the loading ramp is stored.

19 Claims, 8 Drawing Sheets

U.S. PATENT DOCUMENTS

2004/0146385 A1* 7/2004 Edwards et al. ............ 414/537
2006/0104773 A1* 5/2006 Koretsky et al. ............ 414/537

\* cited by examiner

ARTICULATED LOADING RAMP

CROSS-REFERENCE TO RELATED APPLICATIONS

This application claims the benefit of U.S. provisional application Ser. No. 61/123,393 filed Apr. 7, 2008.

BACKGROUND OF THE INVENTION

1. Field of the Invention

The present invention relates to a loading ramp for a vehicle that is stored on a vehicle floor when not in use and extended either manually or by a power drive mechanism.

2. Background Art

Loading ramps are known to be used with vehicles to facilitate loading parcels or wheelchairs into the vehicle. Conventional loading ramps are rigid board-like structures that may be stored in a sub-floor pocket of a delivery truck or may be hinged structures that are folded for storage.

There is a need for a compact loading ramp that may be partially or fully extended in either automatic or manual operation modes. There is also a need for a loading ramp that is easily stored within a vehicle and that is usable in different environments and on a variety of supporting surfaces. It would be desirable to have a loading ramp that may be manufactured in different lengths and widths and is inexpensive to manufacture and install on a vehicle.

The present invention is directed to solving the above problems and other problems as summarized below.

SUMMARY OF THE INVENTION

A loading ramp for a vehicle is disclosed that requires low capital cost investment and is made up of components that are not particularly expensive. The loading ramp is easy to assemble and is also easy to install on a vehicle. In addition, the loading ramp must be adaptable to different vehicle styles with a minimum cost to adapt the general design to a particular vehicle.

According to other aspects of this development, the loading ramp preferably offers an incline ratio of 4:1 in its fully extended position. The loading ramp also may be deployed in a less than fully extended position, i.e., an incline ratio of 2:1 position, and other degrees of extension. The loading ramp preferably is capable of supporting more than 12,000 pounds in its fully extended position.

The loading ramp is intended to be automatically actuated or manually operated. In the automatically actuated embodiment, the automatic extension and retraction mechanism may have a maximum force of resistance that can be accommodated while resistance forces greater than a predetermined level result in automatic interruption of extension or retraction of the loading ramp. Other features of the loading ramp are that a minimum package height is possible while still providing a side guard rail on the sides of the ramp. The ramp should be weather resistant and durable. The ramp must be deployable on uneven ground surfaces.

In addition, the ramp surface is intended to provide a high friction surface and also is intended to be resistant to abrasion caused by extending and retracting the ramp from a vehicle. The ramp also must be adaptable to be manufactured in various lengths and widths and may be easily adapted to different types of vehicles.

These and other aspects of the loading ramp developed by Applicants will be better understood in view of the attached drawings and the following detailed description.

DETAILED DESCRIPTION OF THE PREFERRED EMBODIMENT(S)

Figure 1:
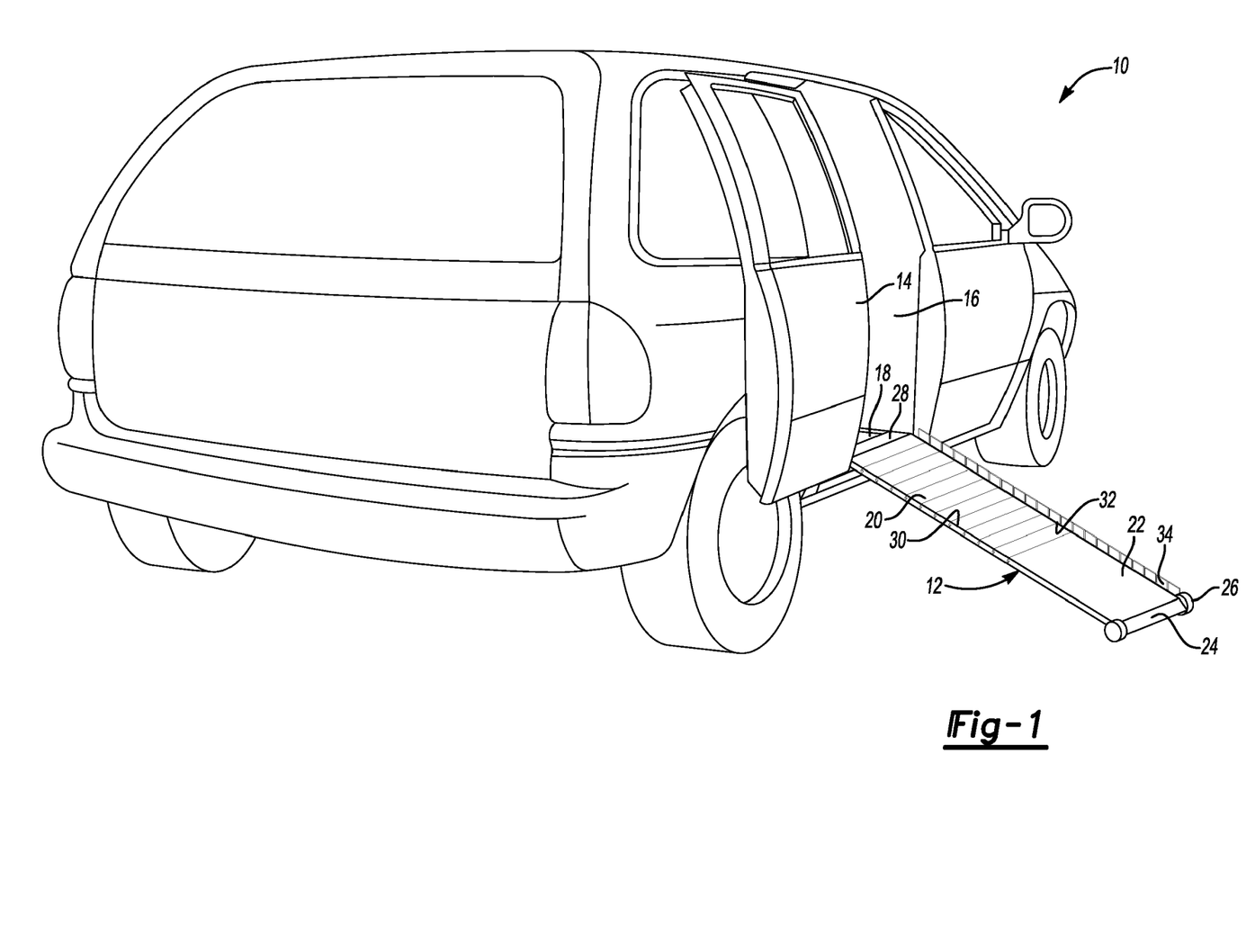
FIG. 1 is a rear side perspective view of a vehicle having a loading ramp deployed from a side door opening.

Referring to FIG. 1, the vehicle 10 is shown with a loading ramp 12. A door 14 of the vehicle is shown in position with its associated doorway 16 being opened. The loading ramp 12 extends through the doorway 16 from a floor 18 of the vehicle 10. The loading ramp 12 is made up of a plurality of sections 20, or planks, that are joined together in a partially pivotal manner as will described further below. An end section 22 that is of greater length may be provided that is connected to the other sections 20. The loading ramp 12 has a length-wise direction as measured from the floor of the vehicle to the surface engaging front end 24. The surface engaging front portion 24 of the loading ramp 12 is adapted to engage the ground or other supporting surface. A roller 26, or a set of wheels, may be provided on the surface engaging front portion 24 to facilitate moving the loading ramp 12 along the ground between a minimum and a maximum extension position. The rollers 26, or wheels, are intended to reduce abrasion of the surface engaging front portion 24 of the loading ramp 12. The last section that is supported by the floor, depending upon the extent to which the loading ramp 12 is extended from the vehicle 10, may be referred to as a floor retained section 28. One or more of the sections 20 may be designated as one of the floor retained sections 28 when they are disposed on the floor 18.

Each of the sections 20 has a first end 30 and a second end 32 that correspond to the front and rear sides of the loading ramp 12 in the vehicle direction. As shown in FIG. 1, one set of side guards 34 is shown extending perpendicular relative to the surface of the loading ramp 12 on the second end 32 side of the loading ramp 12. The first end 30 is shown without the side guards 34. It should be understood that while the side guards 34 may be provided as an added feature, the basic concept of the loading ramp 12 may be practiced without incorporating the side guards as shown on the first end 30 of the loading ramp in FIG. 1.

Figure 2:
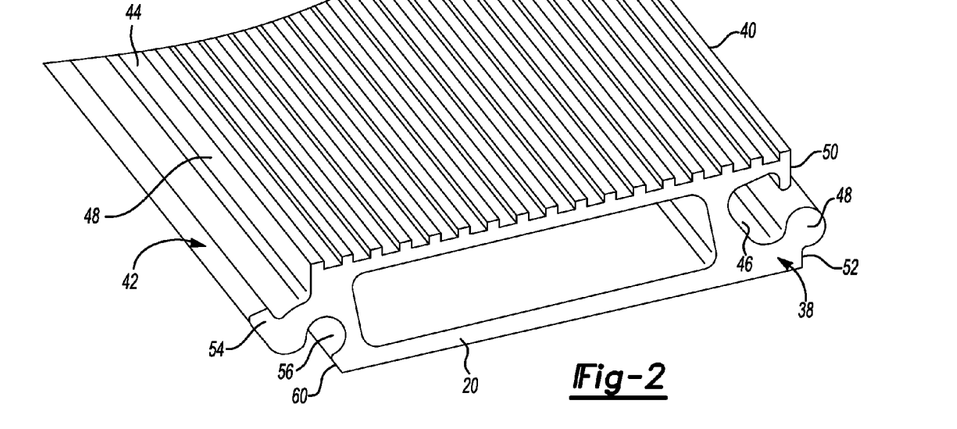
FIG. 2 is a fragmentary perspective view of a loading ramp section.
Figure 3:
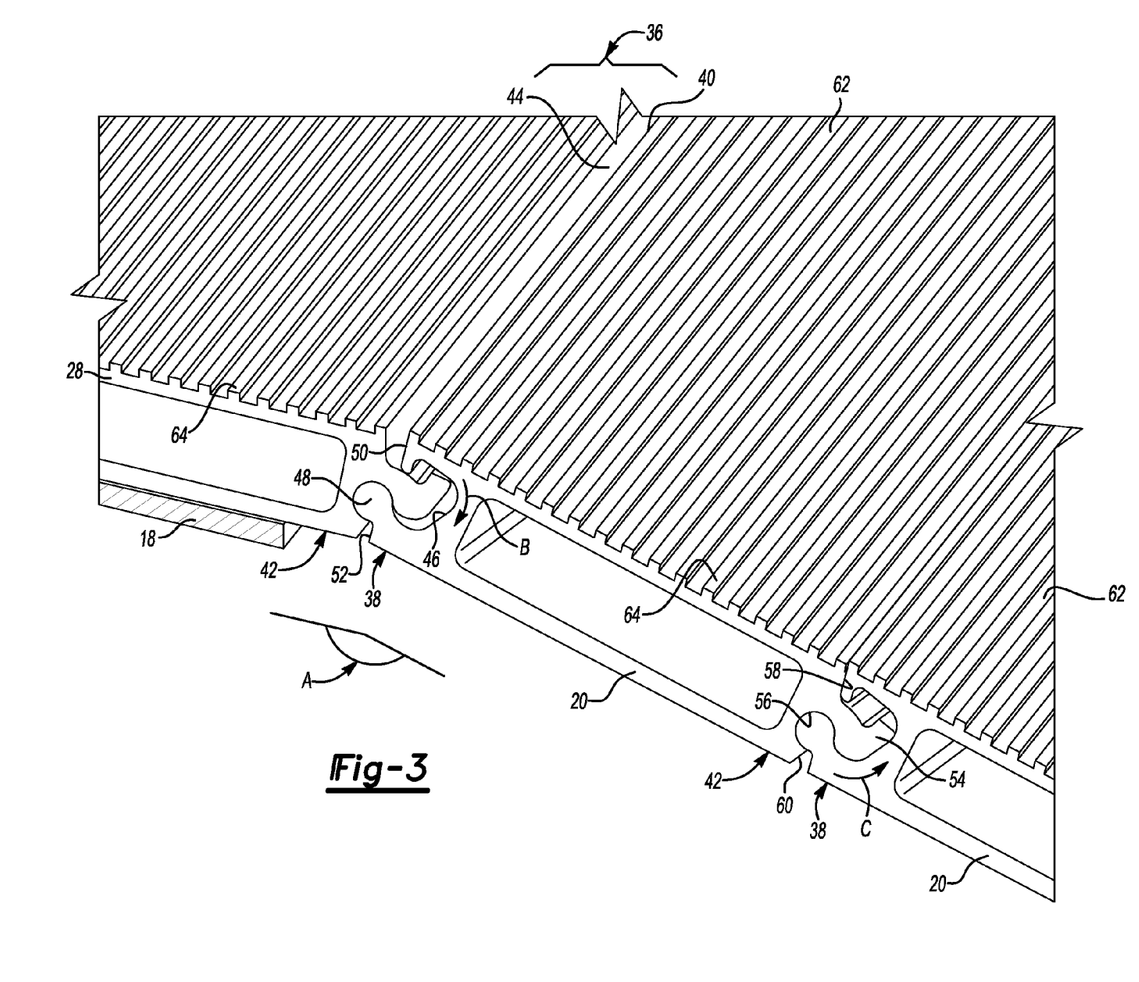
FIG. 3 is a fragmentary perspective view of a plurality of sections of a loading ramp.

Referring to FIGS. 2 and 3, the structure and operation of the loading ramp 12 as to the partial pivoting connection between adjacent section 20 is described in greater detail. In FIG. 2, one section 20 is shown in isolation. In FIG. 3, parts of three sections of the loading ramp are shown. The floor retained section 28 is disposed on and parallel to the floor 18 and the other sections 20 are shown extending downwardly from the floor retained section 18 at an angle referred to as the ramp angle that is shown diagrammatically by arrow "A" in FIG. 3.

With continuing reference to FIGS. 2 and 3, the sections 20 include a pivotal connector that is generally identified by reference numeral 36. A groove pivot connector part 38 is provided on a first side 40 of the sections 20. A tongue pivot connector part 42 is provided on a second side 44 of the sections 20. A recess 46 is provided on the groove pivot connector part 38 and is located adjacent to a cylindrical protrusion 48. An abutment stop 50 is provided for engagement with an adjacent section 20 when the sections are aligned. A first pivot stop surface 52 is provided below the cylindrical protrusion 48 that stops the pivoting motion of the first section 20 that is adjacent to the floor retained section 28 at the top of the ramp 12. The tongue side connector part 42 includes an arcuate finger 54 that is received in the recess 46 of the groove pivot connector part 38. A cylindrical recess 56 receives the cylindrical protrusion 48 of the groove pivot connector part 38. An abutment wall 58 is provided above the arcuate finger 54 and is oriented to engage the abutment stop 50. A second pivot stop surface 60 is provided below the cylindrical recess 56 and is oriented to engage the first pivot stop surface 52 when the floor retained section 28 at the top of ramp 12 and the first section 20 of the ramp are pivoted to their maximum extent.

Clearance is provided within the recess 46 to permit adjacent section 20 to tip downwardly while remaining in contact with its adjacent panel 20. Abutment stop 50 and abutment wall 58 are provided on adjacent panels to stop the panels 20 from moving in one direction past a line to form a continuous surface wherein the top surfaces 62 of the sections 20 are in alignment. When the loading ramp 12 is extended, the arcuate finger 54 is permitted to rotate to up to approximately 20° within the recess 46 until first pivot stop surface 52 engages the second pivot stop surface 60.

The sections 20 have a top surface 62 that is provided with a plurality of traction ribs 64. The traction ribs 64 as shown extend across the ramp 12. It should be understood that the top surface 62 may include serrations or may be otherwise textured, coated or provided with grip tape to provide a gripping or friction surface.

Figure 4:
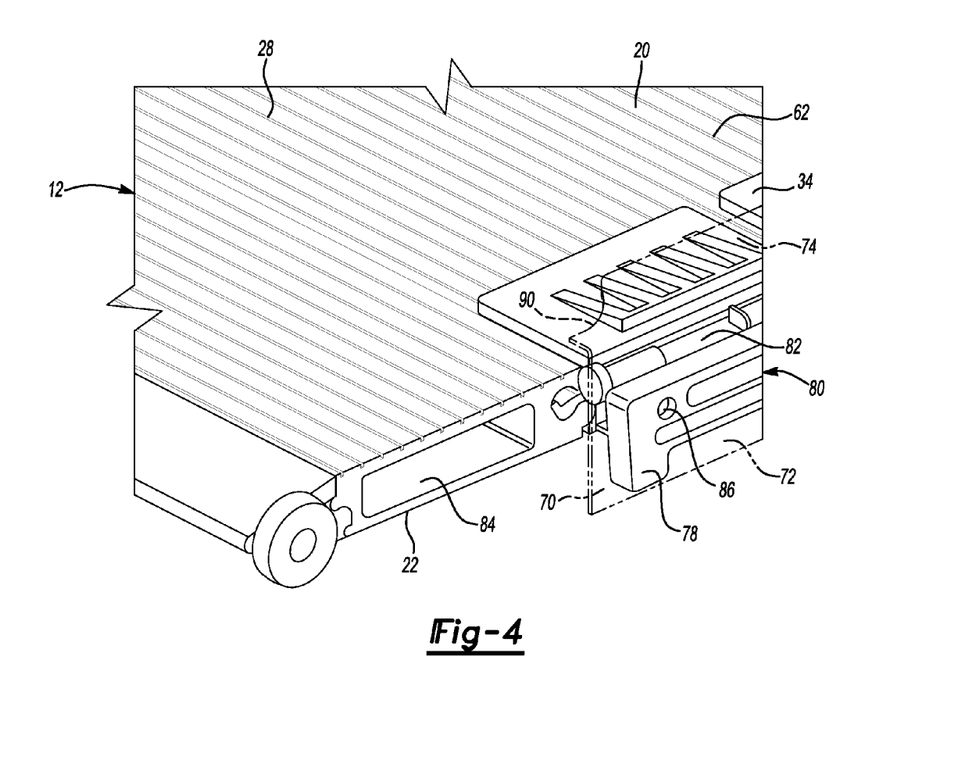
FIG. 4 is a fragmentary perspective view of an end section and an immediate sections of a loading ramp shown with side guards in their folded position.

Referring to FIGS. 2-4, the sections 20 of the loading ramp 12 when disposed on the floor 18 of the vehicle 10 are held to the floor 18 by ramp retainer rails 70 that retain the sections 20. When the ramp 12 is fully extended, one or more floor retained sections 28 may be retained by the ramp retainer rail 70. When the loading ramp 12 is extended to a lesser extent, several sections 20 may be captured by the retainer rails 70. Each of the ramp retainer rails 70 include a vertical leg 72 that extends perpendicular to the top surface 62 of the loading ramp 12. A horizontal leg 74 extends in a parallel orientation relative to the top surface 62 of the loading ramp 12.

The sections 20 are assembled so that the top surface 62 may be aligned in a planar orientation to define a flat upper surface when the loading ramp 12 is stored in the vehicle. As the loading ramp 12 is extended and retracted, two panels 20 may pivot to a limited extent when not supported by the floor 18 to allow the first unrestrained section 20 to pivot downwardly from the vehicle 10 toward the ground at the ramp angle "A". The sections 20 are freed from the ramp retainer rails 70 as they are moved off of the floor 18. The first unrestrained section 20 rotates downwardly relative to the floor retained section 28, as shown by arcuate arrow "B", to a limited extent as limited by the first and second pivot stop surfaces 52 and 60. The pivoting motion may be limited alternatively by the clearance provided within the recess 46 for the arcuate finger 54. The abutment stop 50 and abutment wall 58 prevent the sections 20 forming the ramp 18 from flexing in the opposite direction so that the ramp 18 defines a planar top surface 62. The force applied by the ground to the ramp rotates the sections 20, as shown by arcuate arrow "C", to align the ramp 12 between the ground and the vehicle 10 in a linear array.

Figures 5, 6, 7:
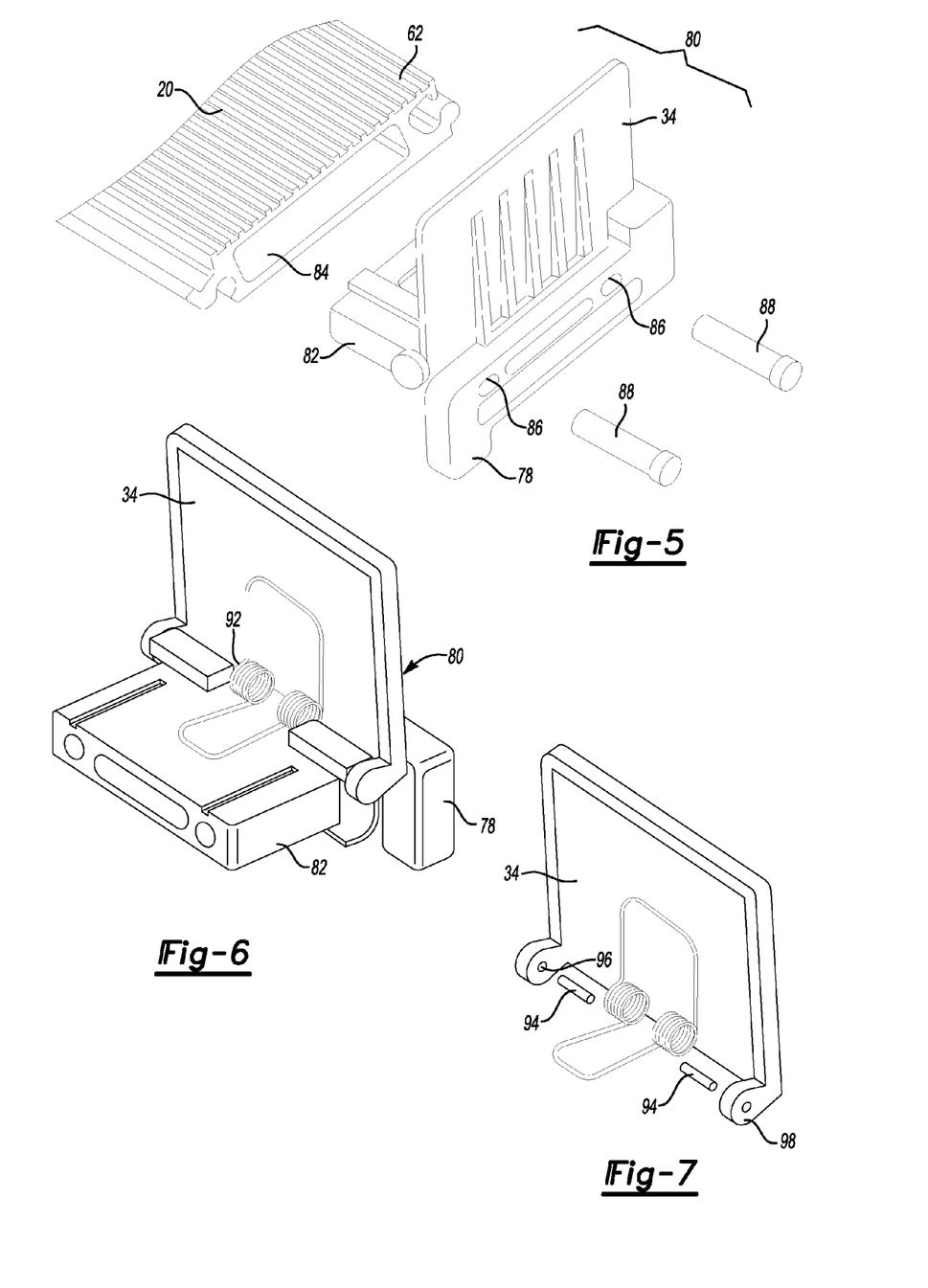
FIG. 5 is an exploded perspective view of a section of a loading ramp, side guard and end cap.
FIG. 6 is a perspective view of an end cap and side guard shown separated from the end of the section of the loading ramp.
FIG. 7 is a perspective view of a side guard in isolation in its vertically oriented or erect position.

Referring to FIGS. 4 and 5, an end wall 78 is provided as part of an end cap assembly 80. The end cap assembly 80 includes an inner extension 82 that is received in an end opening 84 formed in the sections 20. Openings 86 are provided through the end wall 78 that receive fasteners 88. The fasteners 88 secure the end cap assembly 80 within the end opening 84 of the sections 20. The fasteners 88 may be received within plastic plugs (not shown) that are expanded to lock the end cap assembly within the end opening 84 of the section 20 when the fasteners are tightened.

As shown in FIG. 4, the side guards 34 are shown in their folded over position wherein the side guards 34 are held against the top surface 62 of the section 20. The side guards 34 are held in their folded over position by the horizontal leg 74 of the ramp retainer rail 70. As the loading ramp 12 is extended from the vehicle 10, the side guards 34 are permitted to pivot to their upright position. Movement of the side guards 34 is guided by a side guard guide cam 90.

As shown in FIG. 5, one of the sections 20 is shown with the end cap assembly 80 removed. To assemble the end cap assembly 80 to one of the sections 20, a pair of fasteners 88 are inserted into a pair of openings 86. The inner extension 82 is inserted into the end opening 84 and locked into place by the plastic plugs as previously described. The side guard 34 as shown in FIG. 5 is in its upright position.

Referring to FIG. 6, an end cap assembly 80 is shown in greater detail. The end cap assembly 80 includes end wall 78 and inner extension 82 that extends generally inwardly from the end wall 78. Side guard 34 is shown biased into its upright position by a spring 92.

Referring to FIG. 7, the side guard 34 is shown in isolation. The side guard 34 is attached by a pair of pivot pins 94 to a pair of pivot pin receptacles 96 that are provided in a pair of ears 98. The pins 94 secure the side guards 34 to the end cap assembly 80, as shown in FIG. 6.

Figure 8:
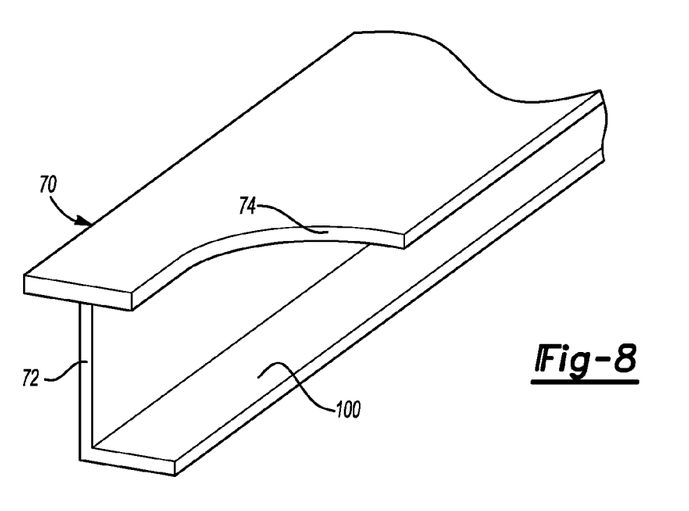
FIG. 8 is a fragmentary perspective view of ramp retainer rail as used to guide movement of the ramp.

Referring to FIG. 8, a portion of the ramp retainer rail 70 is shown to include the vertical leg 72 and horizontal leg 74. The ramp retainer rail 70 also includes a base wall 100 that is used to secure the ramp retainer rail 70 to the floor 18 or other supporting structure provided on the vehicle 10.

Figure 9:
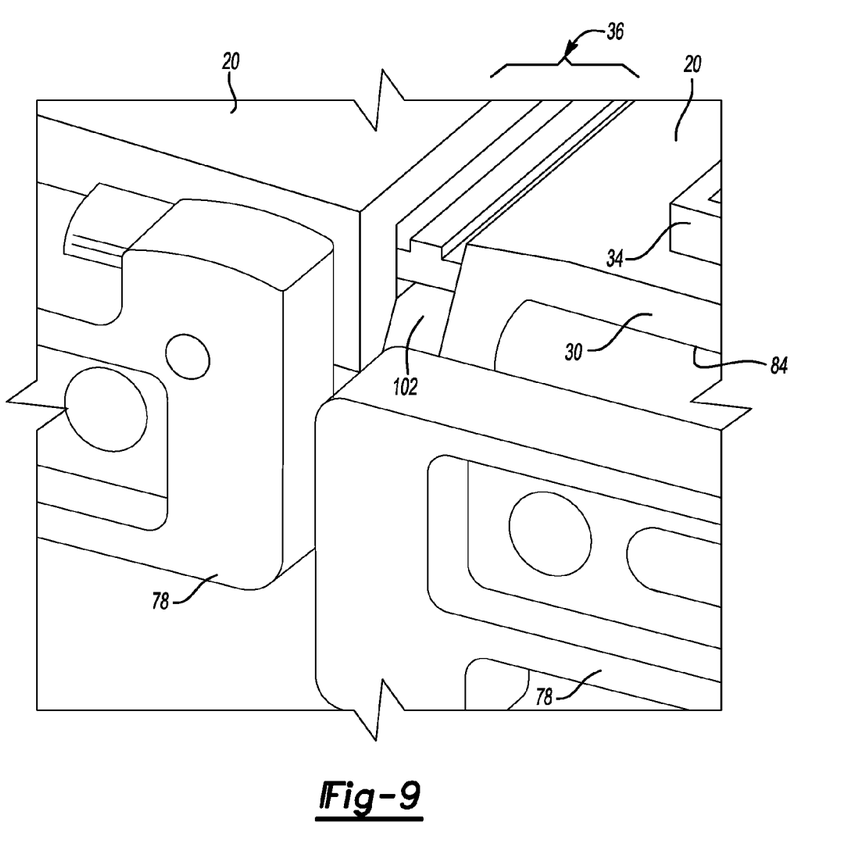
FIG. 9 is a fragmentary perspective view of a drain channel defined between two sections of the loading ramp.

Referring to FIG. 9, the pivotal connector 36 between two adjacent sections 20 are shown with the end walls 78. One end wall 78 is shown partially separated from the first end 30 of the section 20. The end opening 84 is visible with the end wall 78 is partially removed. The side guards 34 are shown in their folded over position. A drain channel 102 is provided between the two side guards 34. Dirt and water are permitted to drain off of the loading ramp 12 through the drain channel 102.

Figure 10:
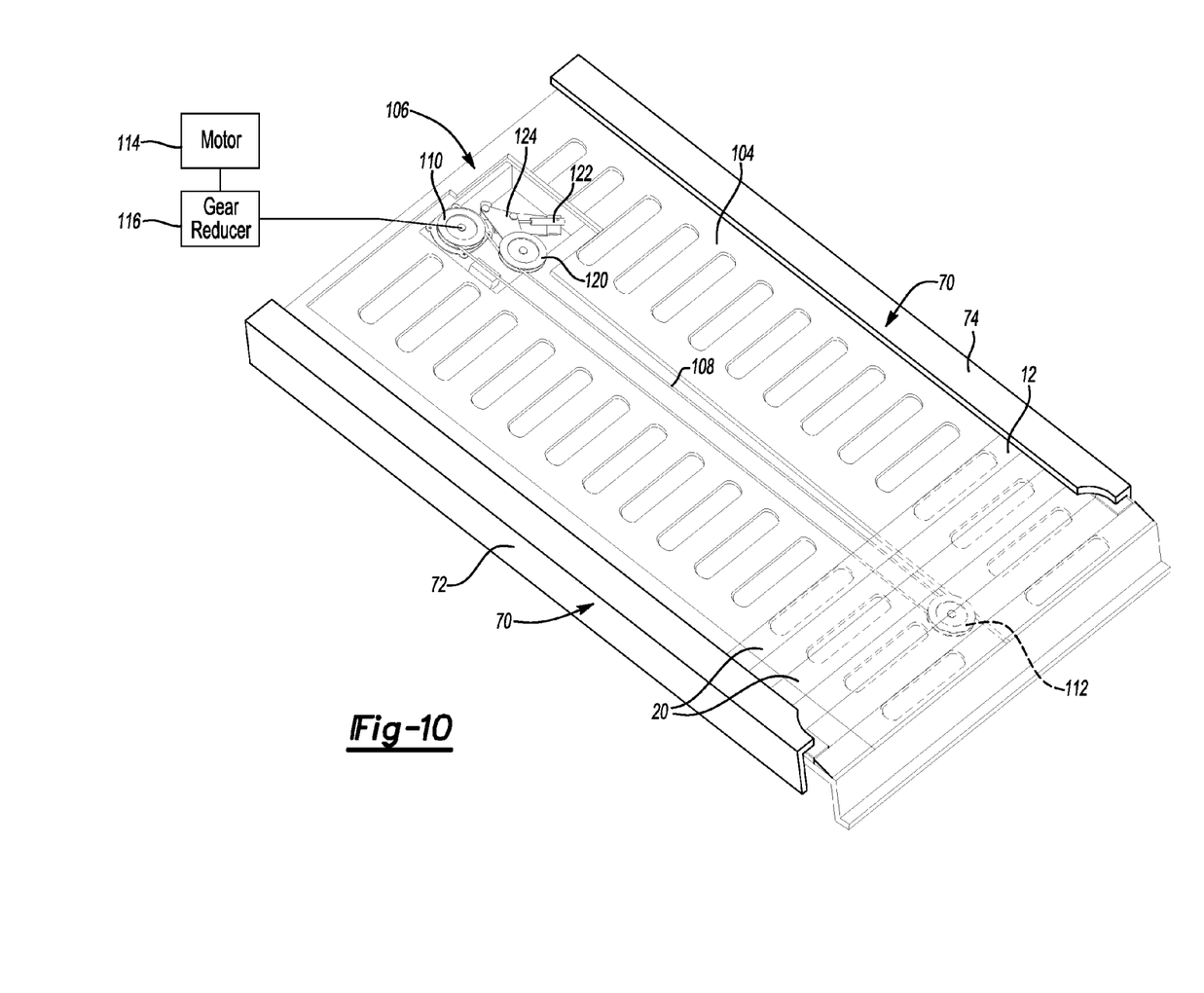
FIG. 10 is a perspective view of one embodiment of an actuating system that may be used to extend and retract the ramp.
Figure 11:
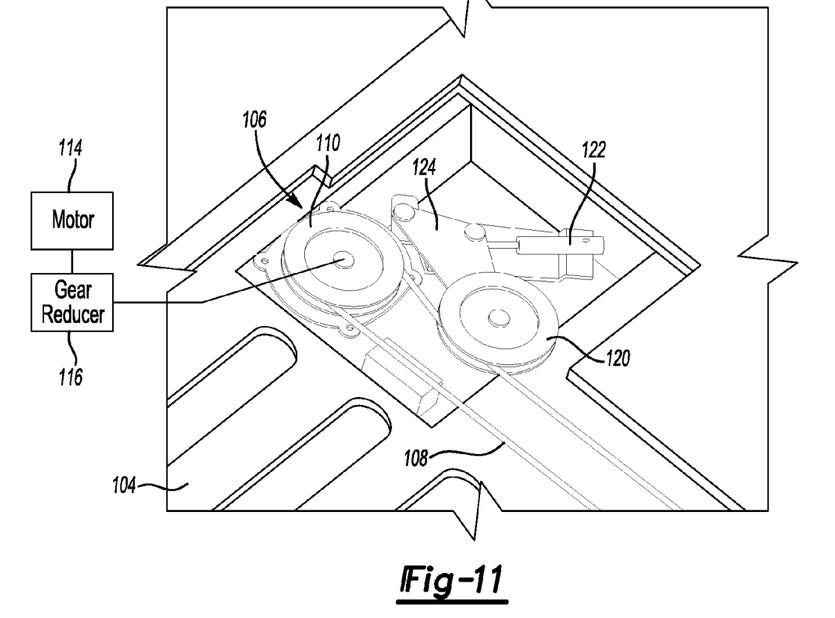
FIG. 11 is a fragmentary perspective view of the actuating system shown in FIG. 10.

Referring to FIGS. 10 and 11, a base plate 104 is shown in which a cable drive actuator 106 is used to extend and retract the loading ramp 12. A cable 108 is entrained around a drive pulley 110 and a return pulley 112. The loading ramp 12 is secured to the cable 108 by clamps or fasteners to the bottom of two or more of the sections 20 (not shown). A motor 114 is operatively connected to a gear reducer 116 that, in combination, are operative to drive the drive pulley 110. A clutch wheel 120 engages the cable 108. A spring cylinder 122 acts on a pivot bracket 124 to engage and disengage the clutch wheel 120 relative to the cable 108. The base plate 104 receives the ramp retainer rails 70 with the vertical leg 72 extending vertically above the base plate 104. The horizontal leg 74 of the ramp retainer rail 70 extends partially over the base plate 104 in a spaced relationship. The loading ramp 12 is received between the base plate 104 and the horizontal leg 74 of the ramp retainer rail 70. The sections 20 are retained with the first and second ends 30 and 32 being received between the ramp retainer rails 70.

Clutch wheel 120 is intended to disengage the cable drive actuator 106 in the event an obstruction is encountered by the ramp 12 as it is extended or refracted. If an obstruction is contacted, the clutch wheel 120 is pivoted on the pivot bracket 124 to thereby allow the cable 108 to slip and interrupt extension or retraction of the loading ramp 12.

Figure 12:
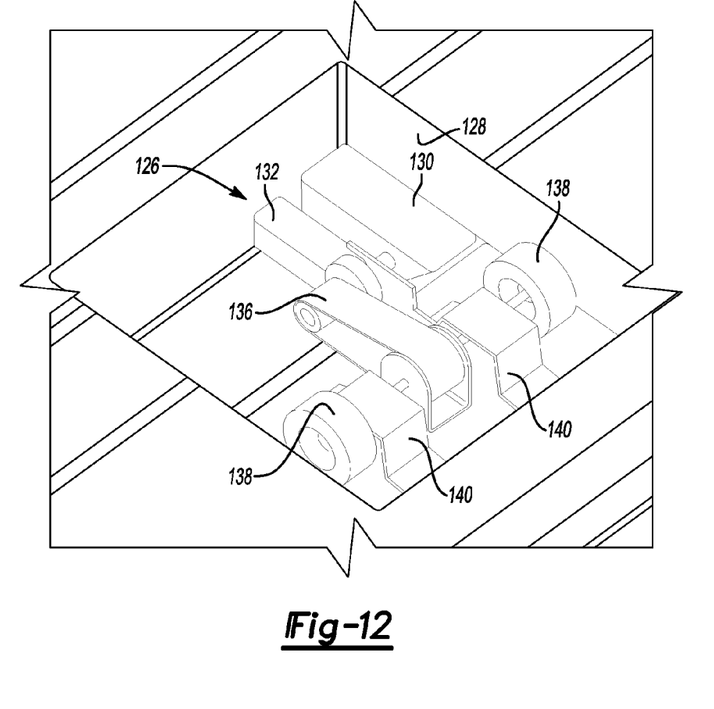
FIG. 12 is a fragmentary perspective view of an alternative embodiment of an actuating system that may be used to extend and retract the ramp.

Referring to FIG. 12, an alternative embodiment of a drive 126 is shown. The drive 126 is received within a drive well 128. A drive motor 130 and gear reducer 132 drive a belt drive 136. The belt drive 136 may alternatively be a chain drive, if desired. The belt drive 136 drives a pair of drive wheels 138. The drive wheels 138 are rotated by the drive 126 to extend and retract the loading ramp 12. The drive belt 136 drives the wheels 138 rotationally in one direction to drive the loading ramp 12 into its extended position and is rotated in the opposite direction to pull the ramp back into the retracted position. Brackets 140 retain the drive wheels 138 within the drive well 128.

Figure 13:
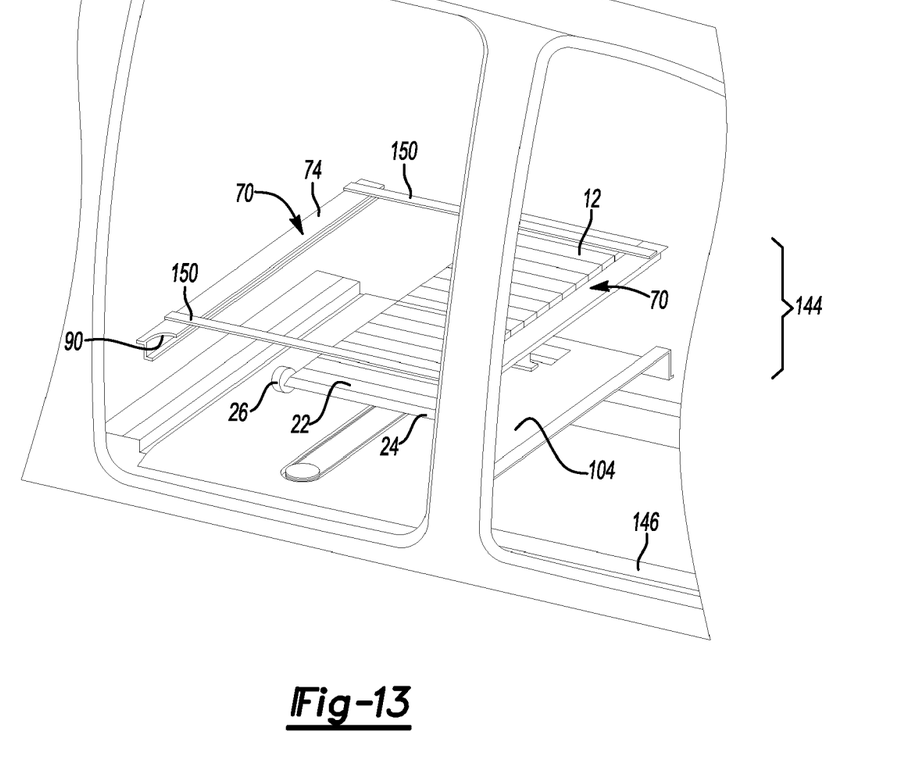
FIG. 13 is a fragmentary exploded perspective view showing the ramp module as it is installed in a vehicle.

Referring to FIG. 13, assembly of a modular loading ramp assembly 144 will be described. The modular assembly 144 includes the loading ramp 12, ramp retainer rails 70 and the base plate 104. The ramp 12 is assembled by assembling the sections 20 together with the end section 22. The end section 22 is provided with the surface engaging front end 24 that may include one or more rollers 26 that facilitate moving the end section 22 along a supporting surface or the ground. Frame rails 146 extend longitudinally relative to the vehicle 10. The base plate 104 is secured to the frame rails 146. It should be noted that a floor panel may be provided between base plate 104 and the frame rails 146 and floor frame rails 148. Alternatively, the base plate 104 may form the floor of the vehicle in the area of the loading ramp 12.

During assembly, the ramp retainer rails 70 may be interconnected by cross members 150 that secure the ramp retainer rails 70 together to retain the loading ramp 12 between the two spaced ramp retainer rails 70. The end cap assemblies 80 (not shown in FIG. 12) are assembled to the sections 20 before they are assembled between the ramp retainer rails 70. The loading ramp 12 is assembled into a cassette or modular assembly 144 formed by the ramp retainer rails 70 and the cross members 150. The base plate 104 and either the cable drive actuator 106 or the drive 126, as shown in FIGS. 10-12, are assembled to the base plate 104. The base plate 104 is assembled to the frame rails 146. After the base plate 104 is assembled to the vehicle, the modular assembly 144 including the loading ramp 12 is assembled to the base plate 104 that was previously assembled to the vehicle 10.

The assembly sequence for assembling the ramp 12 to the vehicle 10 is described below. The sections 20 are first assembled together in a tongue and groove fashion with the groove pivot connector part 38 being assembled to the tongue pivot connector part 42. The sections 20 are initially loosely assembled to form the full length loading ramp 12. The end section 22 of the ramp 12 may be formed by welding a plurality of sections together. The sections may be welded together by means of ultrasonic welding, glueing, or otherwise joining the panels together. The panels may be made of plastic or may be formed of aluminum or other metal. If the panels are formed of metal, they may be welded by conventional metal welding techniques. The sections 20 are assembled to the end section 22 and are connected together in an articulated manner by the pivotal connectors 36. The pivotal connectors 36 permit the ramp to tilt downwardly as it is extended from the vehicle 10 to provide a convenient loading ramp 12. The surface engaging front portion 24 is attached to the end section 22. The surface engaging front section 24 may be provided a roller 26, or set of wheels, that allows the ramp to roll over the supporting surface or ground that the ramp 12 engages when it is extended from the vehicle 10.

Ramp retainer rails 70 are assembled to cross members 150 that align and retain the ramp retainer rails 70 in a parallel orientation relative to each other prior to being assembled to the base plate 104. The ramp 12 includes a plurality of the sections 20 to which the end cap assemblies 80 and side guards 34 are assembled. The ramp 12 is inserted between the two ramp retainer rails 70. The side guards 34 are folded down as they are inserted between the ramp retainer rails 70 by the horizontal legs 74. The side guard guide cams 90 provided on the horizontal leg 74 guide the side guards 34 into their folded over position as the loading ramp 12 is inserted between the ramp retainer rails 70.

The base plate 104 is assembled to the frame rails 146 and floor frame rails 148 that are provided on the vehicle 10. The cable drive actuator 106 or belt drive 126 is assembled to the base plate 104. Once the base plate 104 is assembled to the vehicle, the ramp 12, ramp retainer rails 70 and cross members 150 are assembled to the base plate 104. The cross members 150 hold the ramp retainer rails 70 together with the assembled sections 20 until the ramp retainer rails 70 are secured to the base plate 104. The cross members 150 may then be removed from the ramp retainer rails 70 to provide clearance for operation of the loading ramp 12. The ramp retainer rails 70 are assembled by welding or by fasteners to the base plate 104. The loading ramp 12 covers the base plate 104, and the drive cable actuator 106, or the drive 126 when in the stored position.

During assembly, the loading ramp 12 is retracted within the ramp retainer rails 70 until it is fully installed in the vehicle. After installation, the loading ramp 12 may be withdrawn from the ramp retainer rails 70. As the initial section of welded panels is withdrawn from the vehicle, they remain in a planar orientation relative to each other. After the initial portion of the loading ramp 12 is withdrawn, the sections 20 permit the ramp to pivot downwardly as shown in FIG. 3 by the arcuate arrow "B" as limited by the first and second pivot stop surfaces 52 and 60. The pivotal connector 36 immediately adjacent the doorway 16 is the only connector that is permitted to pivot with the weight of the ramp 12 causing the ramp 12 to pivot downwardly, as shown in FIG. 3 by arcuate arrow "B". The downward pivot motion is limited by pivot stop 52 engaging pivot stop surface 60.

Pivot connectors 36 that are disposed outboard of the doorway 16 are rotated back in the opposite direction, as shown in FIG. 3 by the arcuate arrow "C." The force of the loading ramp 12 engaging the supporting surface causes the sections 20 outboard of the doorway to rotate in the direction illustrated by arrow "C" in FIG. 3 causing the abutment stop 50 to engage the abutment wall 58 of adjacent sections 20. The fused or fixed end panel 22 and the panels 20 are aligned by the abutment stop 50 and abutment wall 58 that cause the panels to be aligned and provide a flat surface for the loading ramp 12 that extends from the ground engaging surface to the vehicle 10.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A ramp assembly for a vehicle comprising:
a plurality of sections that have a partially pivotal connector provided between each adjacent section;
a retainer secured to a load floor of the vehicle that retains at least one of the sections on the load floor;
at least one of the plurality of the sections may be shifted off of the load floor to form a ramp between the load floor and a supporting surface that is remote from the load floor; and
wherein each of said at least one section shifted off of the load floor forming the ramp are held in alignment relative to each other and are pivoted to a ramp angle by one of the partially pivotal connectors having a tongue part and a groove part between the at least one section retained on the load floor and the adjacent section shifted off of the load floor extending along the side of a ramp section; a tongue part having an adjacent recess that is cylindrical in cross section and configured to receive a protrusion adjacent a groove part of said second adjacent section; said tongue part having a finger configured to be received in said groove part of said second ramp section.

2. The ramp assembly of claim 1 wherein the weight of the ramp sections shifted off of the load floor applies a force to the sections disposed outside the doorway that keeps the sections disposed outside the doorway aligned at the ramp angle.

3. The ramp assembly of claim 1 further comprising a motor drive operatively connected between the load floor and the plurality of sections to extend and retract the ramp relative to the retainer.

4. The ramp assembly of claim 3 further comprising an endless loop driven by the motor drive that is attached to the ramp and entrained between a pair of guide wheels that are rotatably assembled to the floor.

5. The ramp assembly of claim 3 further comprising a roller drive coupling between the drive motor and the ramp member.

6. The ramp assembly of claim 1 further comprising a plurality of side edge guards that are pivotally secured to first and second sides of each section shifted off of the load floor, wherein the side edge guards are disposed in a position parallel to and overlying one of the sections when the section is within the retainer and are disposed in a position substantially perpendicular to the section when the section is outside the retainer.

7. The invention as described in claim 1, wherein said tongue part has an arcuate finger.

8. A ramp assembly for a vehicle that includes a load floor and a doorway, the ramp assembly comprising:
a retained ramp section;
a ramp member having a width and a length, the ramp member has at least two sections, each section of said ramp member has a first side extending across the width of the ramp member and a second side extending along the length of the ramp member, each section has a first pivot connector part on at least one of the first sides with a cylindrical cross section recess, that is pivotally connected to a second connector part at one of the first sides of one of the adjacent section said second connector part having a cylindrical protrusion received in the cylindrical cross section recess to form a partially pivotal connector between the at least two sections and a pair of mating abutment members on the first and second connector parts limiting the rotation of said connector parts forming said partially pivotal connector,
a ramp retainer secured to the load floor receives the ramp member and the retained ramp section in a sliding relationship, wherein the ramp member may slide in and out of the ramp retainer, the ramp retainer captures the second sides of the sections forming the ramp member in a stored position, the ramp retainer captures the second sides of the retained ramp section when the other sections are extended from the ramp retainer in the extended position, wherein the retained ramp section disposed on the floor adjacent the doorway has a pivotal connection part mating with a second pivotal connection part on the section disposed outside the doorway that restricts a ramp angle of the section disposed outside, and all sections of the ramp section disposed outside are aligned at the ramp angle.

9. The ramp assembly of claim 8 wherein the first pivot connector part and the second pivot connector part between any of the sections may provide the pivot connection between one of the sections disposed on the load floor and the first one of the sections disposed outside the doorway.

10. The ramp assembly of claim 8 wherein the ramp member has a ground engaging edge that is provided on the distal end of the ramp member section that is placed on the supporting surface when the ramp is in the extended position.

11. The ramp assembly of claim 10 the ramp member section is a lead section that is longer in the length direction of the ramp member than the other sections.

12. The ramp assembly of claim 10 wherein the first pivot connector part of the retained ramp section and the second pivot connector part of the adjacent ramp member permit the weight of the ramp to align the sections disposed outside the doorway aligned at the ramp angle.

13. The ramp assembly of claim 8 wherein the ramp angle may be reduced relative to a supporting surface by shifting more of the sections from the ramp retainer off of the load floor and out of the doorway.

14. The ramp assembly of claim 8 further comprising a motor drive operatively connected between the load floor and at least one ramp section to extend and retract the ramp member relative to the ramp retainer.

15. The ramp assembly of claim 14 further comprising an endless loop driven by the motor drive that is attached to the at least one ramp section and entrained between a pair of rotatable guide wheels that are rotatably assembled to the floor.

16. The ramp assembly of claim 14 further comprising a roller drive coupling between the drive motor and the ramp member.

17. The ramp assembly of claim 8 further comprising a plurality of side edge guards that are each pivotally secured to first and second sides of the sections of said ramp member, wherein the side edge guards are disposed in a position parallel to and overlying the one section when the section is within the ramp retainer and are biased upwardly from the one section when the one section is outside the ramp retainer.

18. The ramp assembly of claim 17 wherein the ramp retainer has a flange that holds the side edge guards of the sections within the ramp retainer in the position parallel to and overlying the one section.

19. The ramp assembly of claim 8 wherein the first pivot connector part and the second pivot connector part in section of the ramp member include abutment surfaces to allow all sections of the ramp member to be aligned at the ramp angle without flexing under load.

* * * * *